Figure 1:
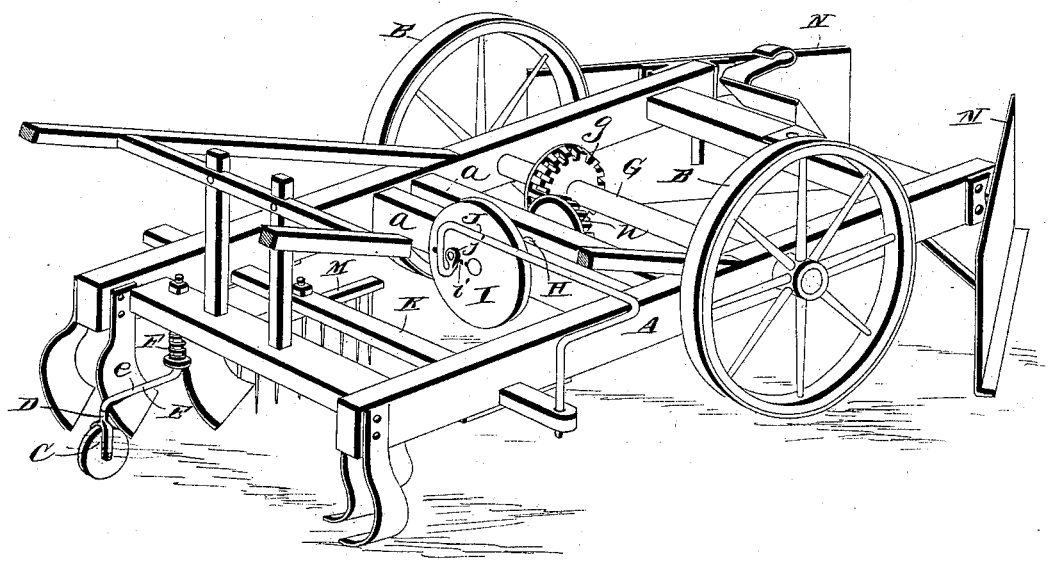

(No Model.)

J. A. GARDNER.
RICE RAKE, COTTON CHOPPER, AND CULTIVATOR.

No. 380,883. Patented Apr. 10, 1888.

WITNESSES.

INVENTOR.
John A. Gardner.
by C. A. Snow & Co.
Attorneys.

UNITED STATES PATENT OFFICE.

JOHN A. GARDNER, OF CALICO, NORTH CAROLINA.

RICE-RAKE, COTTON-CHOPPER, AND CULTIVATOR.

SPECIFICATION forming part of Letters Patent No. 380,883, dated April 10, 1888.

Application filed January 16, 1888. Serial No. 260,844. (No model.)

*To all whom it may concern:*

Be it known that I, JOHN A. GARDNER, a citizen of the United States, residing at Calico, in the county of Pitt and State of North Carolina, have invented new and useful Improvements in Rice-Rakes, Cotton-Choppers, and Cultivators, of which the following is a specification.

The invention relates to improvements in rice-rakes, cotton-choppers, and cultivators.

The object of the invention is to produce a combined rice-rake and cotton-chopper which will, in a positive and reliable manner, either rake rice for the purpose of straightening it out and thinning out the grass, in which case a rake is employed, or for thinning out cotton-plants, and then a hoe or chopper is used.

Furthermore, the object is to produce a combined rice-rake, cotton-chopper, and cultivator that will cultivate the plants by throwing the earth around them simultaneously with the raking or chopping operation.

The invention consists in the novel combination and arrangement of parts hereinafter described, illustrated in the drawings, and pointed out in the appended claim.

Figure 2:
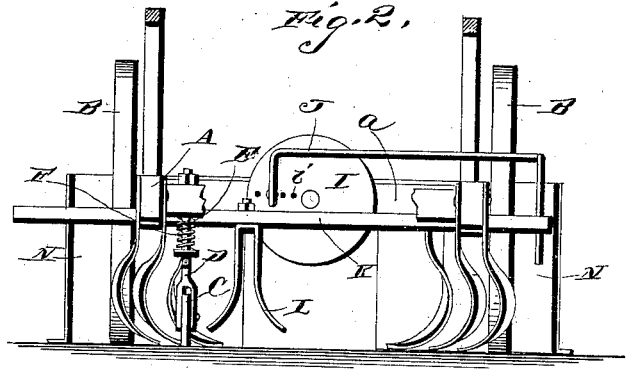

In the accompanying drawings, forming part of this specification, and in which like letters of reference designate corresponding parts, Figure 1 is a perspective view illustrating the reciprocating bar which carries the rake or the chopper and the mechanism that conveys the motion from the driving-wheels to the reciprocating bar. Fig. 2 is a rear view of the same, a hoe or chopper being in place, and the machine being adapted to thinning out cotton-plants.

In the accompanying drawings, A designates a frame, constructed of suitable material, mounted on driving-wheels B, located near the front of the frame, and provided at the rear end, preferably at one side in order to clear the plants, with a wheel, C. This wheel is adapted to support the rear end of the machine, and while I have shown only one of them in the drawings I may prefer to employ two wheels, or make any other slight alterations without departing from the spirit of my invention; but I prefer to use ordinarily only one wheel, in view of cheapness and simplicity, and this is mounted in the bifurcated end of the bar D, which is rigidly secured to the L-shaped bar E, mounted in the main frame and adapted to turn in its mountings. The top of the L-shaped bar E is screw-threaded and provided with a nut or the like to prevent it being withdrawn from the main frame, while at the bottom of it, between the lateral arm $e$ and the lower surface of the main frame, is placed a spring, F, which keeps the main frame a certain distance above the ground, but permits it to be depressed, and consequently the hoe or rake to be lowered when rendered necessary by thick grass or the like. A washer is interposed between the lateral arm $e$ and the spring to form a bearing-surface for the spring. The driving-wheels B are rigidly fixed to the axle G, journaled in suitable bearings in the main frame A and carrying a beveled pinion, $g$.

At one end of a shaft, H, in suitable bearings in cross-pieces $a\ a$ of the main frame A, is a pinion, $h$, that meshes with the pinion $g$ of the axle G. At the other end of this shaft H is a graduated disk, I, provided with a series of holes, $i$, extending from the center of the disk to the circumference, and adapted for the reception of one end of a bent rod, J, that conveys motion from this disk I and imparts it to a reciprocating bar, K, which carries the hoe L and the rake M. By means of this graduated disk the motion of the reciprocating bar K may be regulated and the hoe L and the rake M be caused to move fast or slow. The bent rod J has formed at one end a crank-arm, $j$, adapted to fit in any one of the holes $i$ of the graduated disk I, and is secured therein in any suitable manner. The other end of the rod is suitably secured to one end of the reciprocating bar K. Between the two ends the rod is arched or bent up, in order to clear the side of the main frame A in its movements back and forth during the operation of the machine.

The hoe L, provided with two cutting-edges, is of an inverted-V shape, and is arranged at right angles to the line of motion of the reciprocating bar K, to which it is secured by any preferred means. When it is desired to rake rice, for example, the hoe L is removed, and the rake is similarly secured to the reciprocating bar K. The present machine may be used in the cultivation of all plants where raking is necessary.

On either side of the front of the machine, and at an oblique angle thereto, I provide the shields or guards N, which have their lower edges slightly turned up, forming shovels. These guards or shields N clear away anything that might obstruct the passage of the machine, or give warning of its presence, thereby enabling the operator to raise the hoe or the rake in time to avoid damage.

I also provide the machine with a series of plows, which I prefer to be three or four in number and secured to the sides of the main frame A in any desired manner, whereby the earth will be thrown upon the plants, which will be cultivated simultaneously with the operation of raking or chopping.

The horses or animals designed to draw the combined cultivator, rake, and chopper are attached to it by suitable means, enabling them to walk at one side of the machine, in order to be clear of the plants.

From the foregoing it will clearly be seen that the combined rake, chopper, and cultivator is of cheap and uncomplicated construction, and will perform in a positive and reliable manner the operation of chopping or raking simultaneously with the cultivation of the plants.

Having thus fully described my invention, what I claim as new, and desire to secure by Letters Patent, is—

In a cotton-chopper, a shaft suitably mounted in cross-bars of the main frame and provided at one end with suitable means for receiving motion from the wheels of the chopper and at its other end with a disk having a series of holes or concavities extending from the center to the circumference, a reciprocating bar capable of carrying either a rake or a chopper and having at one of its ends a hole or receptacle, and a rod, one of its ends being adapted to fit in the hole or receptacle of the reciprocating rod and its other end capable of entering any of the holes or concavities of the disk, whereby the motion of the reciprocating bar may be regulated from fast to slow, said rod being bent or arched intermediate of its ends in order to clear the sides of the chopper in its motion back and forth, substantially as described.

In testimony that I claim the foregoing as my own I have hereto affixed my signature in presence of two witnesses.

JOHN A. GARDNER.

Witnesses:
 JOHN H. SIGGERS,
 E. G. SIGGERS.